Oct. 13, 1936.   R. O. DEHLENDORF ET AL   2,057,370
MOTOR SUPPORT
Filed Aug. 4, 1934   2 Sheets-Sheet 2
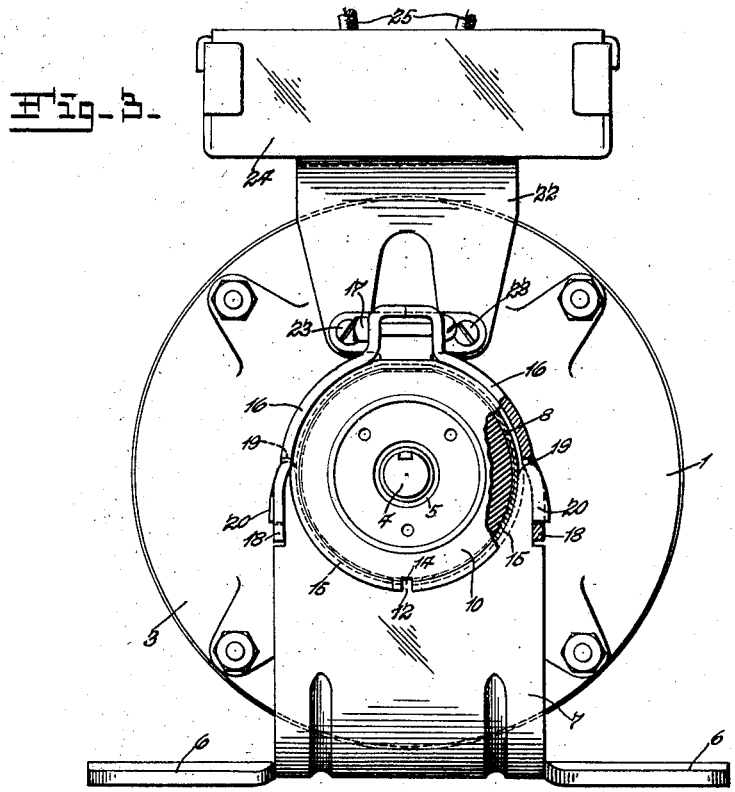
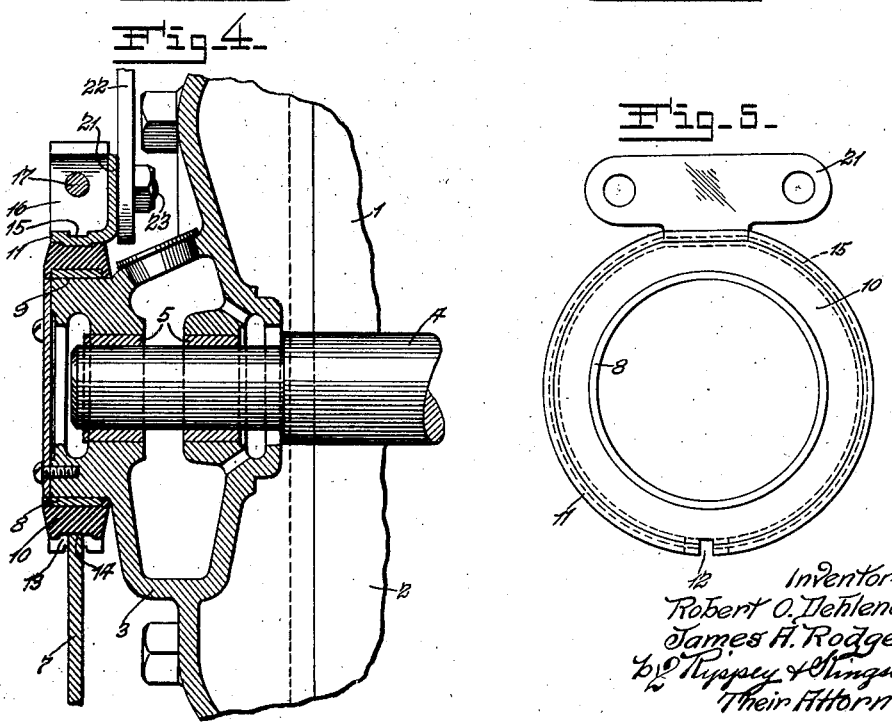
Inventors
Robert O. Dehlendorf
James H. Rodgers
by Kippey & Kingsland
Their Attorneys Patented Oct. 13, 1936

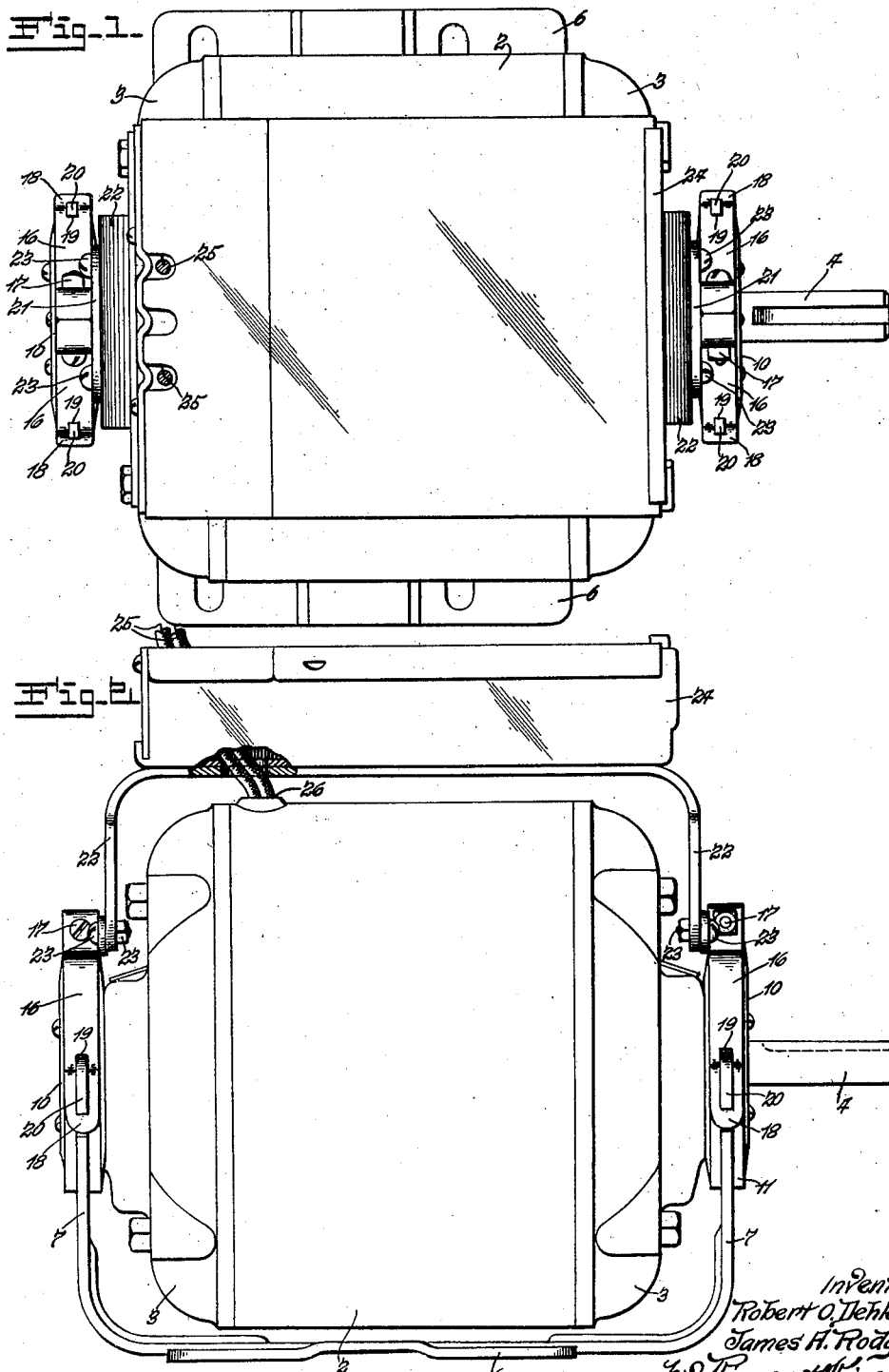

2,057,370

UNITED STATES PATENT OFFICE 2,057,370

MOTOR SUPPORT

Robert O. Dehlendorf, University City, and James A. Rodgers, St. Louis, Mo., assignors to The Emerson Electric Mfg. Co., St. Louis, Mo., a corporation of Missouri Application August 4, 1934, Serial No. 738,386

7 Claims. (Cl. 248—26)

This invention relates to a motor support and more particularly to the combination of a motor support with means for mounting auxiliary equipment such as condensers and terminal assembly.

Heretofore it has been the practice to mount such auxiliary equipment, or accessories, on the frame of the motor. This has the advantage, of course, of making the connections between the motor itself and the accessory box short in length and permits the placing of the connections to avoid their disturbance when moving the motor or when objects are moved about the motor. But such an arrangement is in some cases objectionable, because it increases the magnitude of the motor vibration. That is to say, the amount of noise which is radiated from the motor is dependent not only upon the frequency and magnitude of the vibration of the motor itself but is increased by the area of radiating or vibrating surface.

The invention herein described contemplates, therefore, retaining the benefit obtained by having the accessories adjacent the motor with short connections thereto, while providing means for preventing the accessories and their container from transmitting the motor vibration and thereby increasing the noise incident thereto. Such an arrangement is particularly desirable in household installations of electrical machinery where quietness of operation is a desirable characteristic.

It has also been proposed heretofore to employ a mounting having a rubber collar interposed between the motor frame and the mounting in order to absorb vibration from the motor and prevent such vibration from being conducted to the base.

An object of this invention is to provide, in combination with a motor support adapted to minimize vibration, improved means for mounting motor accessories out of contact with the motor frame, but adjacent thereto, in such a manner that the vibration from the motor will not be transmitted to the accessories and their container, and in such a fashion that the accessories are conveniently located for adjustment or repair.

Other and specific objects will be apparent from the following detail description taken in connection with the accompanying drawings, in which—

Fig. 1 is a plan view of a motor embodying this invention;

Fig. 2 is a side elevation;

Fig. 3 is an end elevation partly in section;

Fig. 4 is a vertical section; and

Fig. 5 is a view of the supporting device which will be described later in detail.

In the appended claims there are pointed out the characteristics of the device which applicants consider are essential to their invention. In the accompanying drawings there is illustrated a specific device which is a preferred form of the invention. In this form the supporting base is insulated from the motor by rubber collars. The collars are secured to each end of the frame of the motor and each is surrounded by a metallic sleeve. This sleeve is clamped to an upstanding pedestal on the base, one at each end of the motor. Lugs or brackets are integral with the sleeves respectively and, therefore, are clamped to the pedestals, which are parts of the support or base. A bridge has its ends rigidly secured to the lugs respectively, extends over the frame of the motor, and supports an accessory container secured thereto close to the motor frame and convenient for ready access when required. Because the assembly is close to the motor and a part of the unitary structure, the connections may be short and not subject to interference when the motor is moved or when objects are moved about the motor to substantially the same extent as if the container were secured directly to the motor frame.

A more particular description of the invention, or of the preferred embodiment shown in the drawings, with specific reference to the drawings, now follows.

The motor 1 has a frame including a ring 2 and end plates 3 at each end of the motor. A shaft 4 is supported in bearings 5 in the end plates, as best shown in the sectional view, Fig. 4. In that view, however, only one end plate is shown, it being understood that the other end plate is similar in construction except that the shaft extends outwardly through the opposite end plate as indicated in Figs. 1, 2 and 3. The motor, as shown in the drawings, is an induction capacitor motor of the single phase type which is a motor that is efficient for household service but which generates considerable torsional vibration, as is well known. By "capacitor motor" is meant one which employs starting windings having condensers in circuit therewith to produce a rotating field.

The support to which the motor is attached is a sheet metal structure having a bottom or base with attaching flange 6 and upstanding pedestals 7 integral therewith. A vibration absorbing device, illustrated in Fig. 5, is secured to each end plate of the motor and rests upon and is secured to a pedestal 7. It includes an inner metallic ring 8 which is of such a size as to form a pressed fit on a circular surface 9 on the end plate 6 and concentric with the shaft 4. A rubber collar 10 encompasses the ring 8 and a metallic sleeve 11 surrounds the collar 10. The sleeve 11 is split at its bottom as shown at 12 and has a socket 13 adapted to accommodate a lug 14 (Fig. 3) on the upper surface of the pedestal 7. The upper ends of the pedestal 7 are concave and adapted to fit in a circumferential groove 15 in the periphery of the sleeve 11.

A pair of clamping members 16 are clamped together by a bolt 17 over the top of the sleeve 11 and complete the assembly of the motor with the base. Each of the clamping members 16 has an arcuate portion, as shown in Fig. 3, which engages the sleeve 11, a bottom end portion 18, which has a slot 19 to engage in a lug 20 on the outer edge of the pedestal 7, and upper end portions, which are bent outwardly in order to provide lugs to accommodate the bolt 17.

It will be understood that the ring 8, the collar 10, and the sleeve 11 are securely bonded together, and when the connection is made, as just described, in which the ring 8 is pressed on the end plate 3 and the sleeve 11 rests upon the pedestal 7 and is secured in position by the clamping members 16, the motor and base are secured together in semi-rigid condition. That is to say, the motor is restrained from movement relative to the base except as permitted by the resiliency of the rubber collar 10 which allows a considerable amount of torsional movement of the motor relative to the base as well as some lateral movement. The result of the arrangement is that the collar 10 absorbs the major part of the vibration of the motor and prevents that vibration from being transmitted to the base.

The mounting of the accessory container will now be explained in detail. Each of the sleeves 11 has an upstanding lug or bracket 21 integral therewith and adapted to support one end of a bridge 22, which comprises a plate having downwardly extending ends which are secured to the lug 21 by bolts 23. The container 24, which has heretofore been mentioned generally, is adapted to contain condensers for the motor and the terminal assembly. The container 24 may be fastened to the bridge 22 by spot welding or by other appropriate means.

Leads 25 for connection to a source of power supply extend through appropriate openings in a removable end of the container 24.

Leads or connections from the accessory container 24 to the motor extend through appropriate holes in the bottom of the container and in the bridge 22 and through an appropriate aperture 26 in the motor ring 2 adjacent the opening in the bottom of the container.

Thus, it will be seen that the container 24 is supported in an advantageous position adjacent the motor in such a manner that the leads are short, out of the way of accidental injury and subject to little flexing. But the container 24 is out of direct contact with the motor and insulated therefrom in such a manner that vibrations from the motor will not be enhanced or transmitted by the container.

It will be obvious that various changes may be made in the details of construction, within the scope of the appended claims, without departing from the spirit of this invention, and that the invention may be used in an environment differing materially from that in which it is specifically shown.

We claim:

1. In a motor assembly the improvement comprising a supporting base for the motor, a non-metallic yielding member interposed between the motor and the base, an accessory container supported by the base out of vibrant contact with the motor and over the motor, and leads passing from the container and through an opening in the frame of the motor beneath the container and adjacent thereto.

2. In a motor assembly the improvement comprising a support having a base member and a pair of upstanding pedestals, non-metallic yielding members interposed between the pedestals and the motor frame at the ends of said frame respectively, clamping means for securing the motor to the pedestal with the said yielding members therebetween, a bridge having its ends secured relative to the pedestals and extending over the frame of the motor, and an accessory container secured to and supported by the bridge.

3. In a motor assembly the improvement comprising a non-metallic yielding collar secured at each end to the motor frame, a sleeve about each collar, a supporting base, clamping means for securing the said sleeves to the base, lugs integral with said sleeves, a bridge having its ends secured to the lugs respectively and extending over the frame of the motor and adjacent thereto, and an accessory container secured to and supported by the bridge.

4. In a motor assembly the improvement comprising a non-metallic yielding member secured at each end of the motor frame, a supporting base, clamping means for securing said yielding members to the base whereby the motor is supported through said yielding members, a pair of brackets secured to the base by said clamping means and spaced from the motor by said yielding members, a bridge having its ends secured to the brackets respectively and extending over the frame of the motor and adjacent thereto, and an accessory container secured to and supported by the bridge.

5. In a motor assembly having a support, a motor and vibration absorbing elements interposed between the support and the motor, the improvement comprising a bridge having its ends secured to the base and extending over the frame of the motor and adjacent thereto, and an accessory container secured to and supported by the bridge out of contact with the motor except through the said support and said vibration absorbing elements.

6. In a device of the kind described, a motor, a base therefor including a pair of uprights upon which said motor is adapted to be supported, vibration absorbing means interposed between said motor and said uprights, whereby said uprights may be relatively free of the vibration of the motor, an accessory container, and mounting means supporting said accessory container on and between said vibration-free uprights and adjacent to said motor.

7. A unit including a motor, a base therefor having substantially the same bottom area as the motor, vibration absorbing means mounting the motor on the base whereby said base will be relatively free of vibration, an accessory container having a bottom area not substantially greater than that of the motor, means mounting the accessory container on the base and over the motor, whereby it will be free of vibration, will require leads to the motor of minimum length, and will not add to the base area of the motor.

ROBERT O. DEHLENDORF.
JAMES A. RODGERS.